(12) United States Patent
Chen et al.

(10) Patent No.: US 7,664,976 B2
(45) Date of Patent: Feb. 16, 2010

(54) CONTROLLING CIRCUIT FOR CONTROLLING OPERATING CLOCK AND/OR DRIVING VOLTAGE OF LOGIC CIRCUIT, AND METHOD THEREOF

(75) Inventors: Tseng-Wen Chen, Hsinchu (TW); Chun-Kan Huang, Hsinchu (TW); Tsung-Hsueh Li, Hsinchu (TW)

(73) Assignee: Feature Integration Technology Inc., Chupei, Hsinchu (TW)

( * ) Notice: Subject to any disclaimer, the term of this patent is extended or adjusted under 35 U.S.C. 154(b) by 177 days.

(21) Appl. No.: 11/278,150

(22) Filed: Mar. 31, 2006

(65) Prior Publication Data

US 2006/0220723 A1  Oct. 5, 2006

(30) Foreign Application Priority Data

Mar. 31, 2005 (TW) .............................. 94110213 A
Mar. 31, 2005 (TW) .............................. 94110214 A

(51) Int. Cl.
*G06F 1/04* (2006.01)
*G06F 1/32* (2006.01)
(52) U.S. Cl. .................. 713/322; 713/320; 713/600
(58) Field of Classification Search .................. 53/551, 53/451, 550; 713/300, 320, 322, 323
See application file for complete search history.

(56) References Cited

U.S. PATENT DOCUMENTS 3,915,291 A * 10/1975 Vogts ....................... 198/626.1
4,288,965 A * 9/1981 James ........................ 53/451
4,532,753 A * 8/1985 Kovacs ....................... 53/451
4,578,931 A * 4/1986 Roovers ...................... 53/551
4,840,012 A * 6/1989 Boeckmann ................. 53/410
4,910,943 A * 3/1990 Taylor et al. ................. 53/551
5,125,217 A * 6/1992 Fukuda ....................... 53/551
5,715,656 A * 2/1998 Pearce ........................ 53/451
6,076,171 A * 6/2000 Kawata ...................... 713/501
7,219,252 B1 * 5/2007 Li et al. ...................... 713/501
2003/0126478 A1 * 7/2003 Burns et al. ................. 713/300
2003/0191854 A1 * 10/2003 Hsu et al. .................... 709/233
2005/0071705 A1 * 3/2005 Bruno et al. ................. 713/500

FOREIGN PATENT DOCUMENTS

TW             535050          6/2003

* cited by examiner

*Primary Examiner*—Dennis M Butler
(74) *Attorney, Agent, or Firm*—Winston Hsu

(57) ABSTRACT

A controlling circuit for controlling an operating clock of a logic circuit in an electronic device and the method thereof are disclosed. The controlling circuit includes a storage device, a detector, at least one comparator, and a controller. The storage device stores a first threshold value and a first return value. The detector detects a system load of the electronic device to generate a detection value. The comparator compares the detection value with the first threshold value or the first return value. When the detection value decreases to reach the first threshold value, the comparator generates a first indication signal. When the detection value increase to reach the first return value, the comparator generates a second indication signal. The controller enables underclocking of the logic circuit when receiving the first indication signal, and disables underclocking of the logic circuit when receiving the second indication signal.

20 Claims, 8 Drawing Sheets

CONTROLLING CIRCUIT FOR CONTROLLING OPERATING CLOCK AND/OR DRIVING VOLTAGE OF LOGIC CIRCUIT, AND METHOD THEREOF

BACKGROUND OF THE INVENTION

1. Field of the Invention

The present invention relates to a logic circuit, especially to a controlling circuit and the corresponding method for controlling an operating clock and/or the driving voltage of a logic circuit.

2. Description of the Prior Art

When a computer is running a complicated program or executing bloat-ware (i.e., big software), sometimes it is necessary to adjust the operating frequency of a logic circuit of the computer, a CPU of the computer especially. When the system load of the computer increases, overclocking of the CPU can be enabled, so the operating frequency of the operating clock is increased to handle the extra system load of the computer. On the other hand, when the system load of the computer decreases, overclocking of the CPU can be disabled, so the operating frequency is decreased to save power.

Please refer to FIG. 1. FIG. 1 shows the system load of the computer and the operating frequency of the CPU, where overclocking of the CPU is originally disabled at an initial time point corresponding to system start-up. As shown in FIG. 1, the system load increases and exceeds a predetermined threshold L1 at the time point t1. At this moment, overclocking of the CPU is enabled so the operating frequency of the CPU starts to rise, where the increment of the operating frequency of the CPU is $\Delta f_1$. Afterward, the system load decreases. When the system load falls below the predetermined threshold L1 at the time point t2, overclocking is disabled and the operating frequency of the CPU returns to its initial value.

FIG. 2 shows the system load of the computer and the operating frequency of the CPU, where overclocking of the CPU is originally enabled, conversely. As shown in FIG. 2, the system load decreases and falls below a predetermined threshold L2 at the time point t3. At this moment, overclocking of the CPU is disabled so the operating frequency of the CPU starts to fall, where the decrement of the operating frequency of the CPU is $\Delta f_2$. Afterward, the system load increases. When the system load rises above the predetermined threshold L2 at the time point t4, overclocking is enabled and the operating frequency of the CPU increases to its initial value. Some of those skilled in the art might identify the situations shown in FIG. 2 with enabling underclocking of the CPU at the time point t3 and disabling underclocking of the CPU at the time point t4, respectively.

According to the related art, regarding the case of FIG. 1, it is suggested that while the computer is booting up, the driving voltage inputted into the CPU can be an increased voltage level higher than a normal voltage level that is originally utilized in the case of FIG. 1, in order to satisfy the extra power requirement inside the CPU due to enabling overclocking, where the increased voltage level is not changed until the computer is shut down. However, applying the increased voltage level as the driving voltage is energy inefficient since overclocking might not be enabled all the time. In addition, applying the increased voltage level as the driving voltage usually leads to an extra amount of the increment of the system load, causing the system load idling above the predetermined threshold L1 and therefore causing failure of the threshold detection at the time point t2 mentioned above. That is, by utilizing the predetermined threshold L1 to detect the system load, failing to trigger the decrease of the operating frequency of the CPU at the time point t2 may occur.

On the other hand, regarding the case of FIG. 2, enabling underclocking without applying a decreased voltage level (which is lower than a normal voltage level that is originally utilized in the case of FIG. 2) as the driving voltage is not considered to be real energy efficient since the power saved by merely enabling underclocking (without utilizing the decreased voltage level) is minor.

SUMMARY OF THE INVENTION

One objective of the claimed invention is therefore to provide a method for controlling an operating clock of a logic circuit in an electronic device and the controlling circuit thereof to solve the problem mentioned above.

According to one embodiment of the claimed invention, a controlling circuit for controlling an operating clock of a logic circuit in an electronic device is disclosed. The controlling circuit comprises a storage device, a detector, at least one comparator, and a controller. The storage device stores a first threshold value and a first return value. The first threshold value is different from the first return value. The detector detects a system load of the electronic device to generate a detection value. The comparator, which is coupled to the storage device and the detector, compares the detection value with the first threshold value or the first return value. When the detection value increases to reach the first threshold value, the comparator generates a first indication signal, and then when the detection value decreases to reach the first return value, the comparator generates a second indication signal. The controller, which is coupled to the comparator, enables overclocking of the logic circuit when receiving the first indication signal, and disables overclocking of the logic circuit when receiving the second indication signal.

According to one embodiment of the claimed invention, an controlling circuit for controlling an operating clock of a logic circuit in an electronic device is disclosed. The controlling circuit comprises a storage device, a detector, at least one comparator, and a controller. The storage device stores a first threshold value and a first return value. The first threshold value is different from the first return value. The detector detects a system load of the electronic device to generate a detection value. The comparator, which is coupled to the storage device and the detector, compares the detection value with the first threshold value or the first return value. When the detection value decreases to reach the first threshold value, the comparator generates a first indication signal, and then when the detection value increase to reach the first return value, the comparator generates a second indication signal. The controller, which is coupled to the comparator, enables underclocking of the logic circuit when receiving the first indication signal, and disables underclocking of the logic circuit when receiving the second indication signal.

Accordingly, a method for controlling an operating clock of a logic circuit in an electronic device is disclosed. The method comprises: providing a storage device for storing a first threshold value and a first return value, wherein the first threshold value is different from the first return value; detecting a system load of the electronic device to generate a detection value; comparing the detection value with the first threshold value or the first return value, wherein when the detection value increases to reach the first threshold value, generating a first indication signal, and then when the detection value decreases to reach the first return value, generating a second indication signal; and enabling overclocking of the logic circuit in accordance with the first indication signal, and disabling overclocking of the logic circuit in accordance with the second indication signal.

Accordingly, a method for controlling an operating clock of a logic circuit in an electronic device is disclosed. The method comprises: providing a storage device for storing a first threshold value and a first return value, wherein the first threshold value is different from the first return value; detecting a system load of the electronic device to generate a detection value; comparing the detection value with the first threshold value or the first return value, wherein when the detection value decreases to reach the first threshold value, generating a first indication signal, and then when the detection value increase to reach the first return value, generating a second indication signal; and enabling underclocking of the logic circuit in accordance with the first indication signal, and disabling underclocking of the logic circuit in accordance with the second indication signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
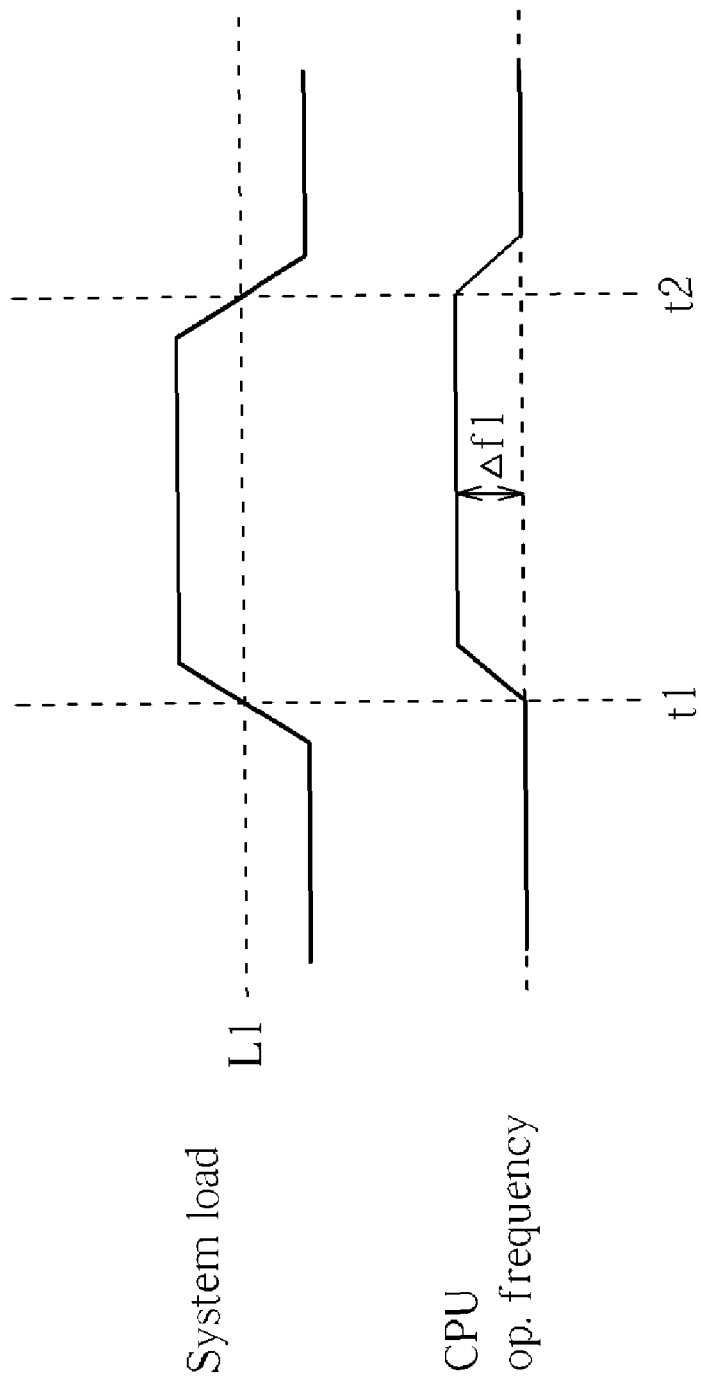
FIG. 1 shows the system load of the computer and the operating frequency of the CPU under an overclocking operation.
Figure 2:
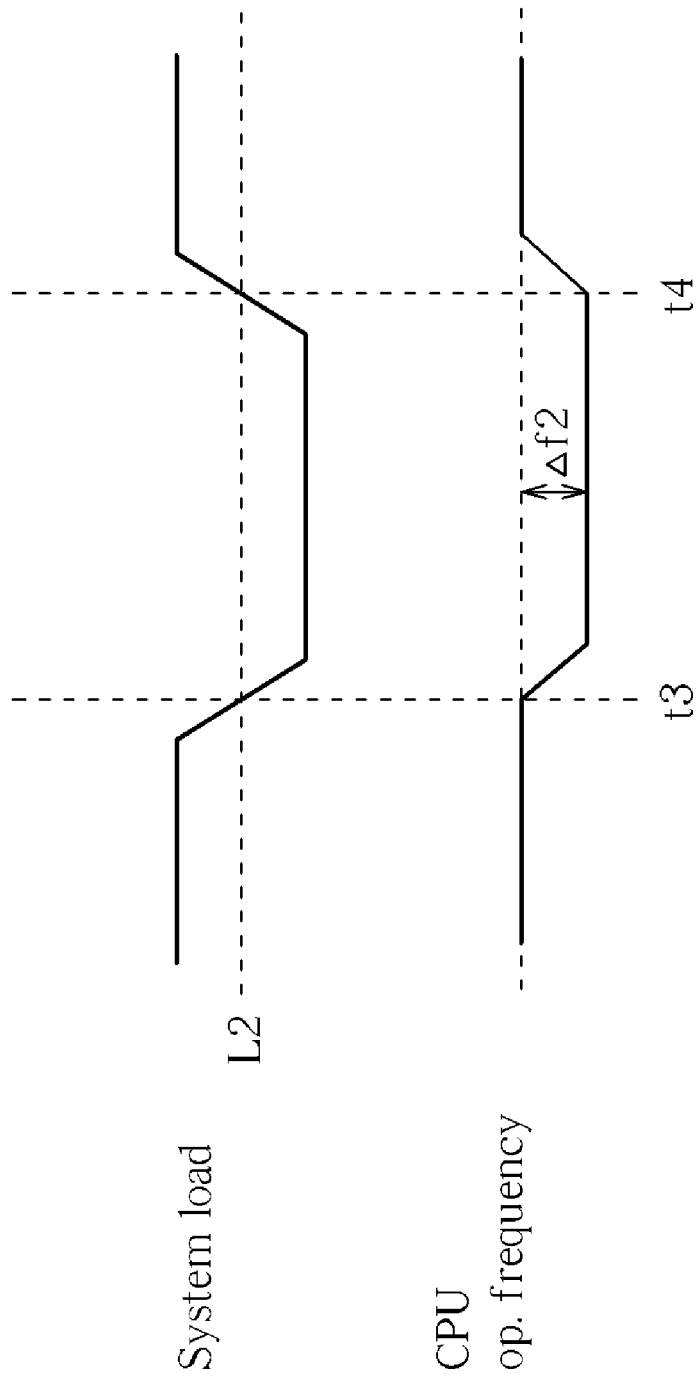
FIG. 2 shows the system load of the computer and the operating frequency of the CPU under an underclocking operation.
Figure 3:
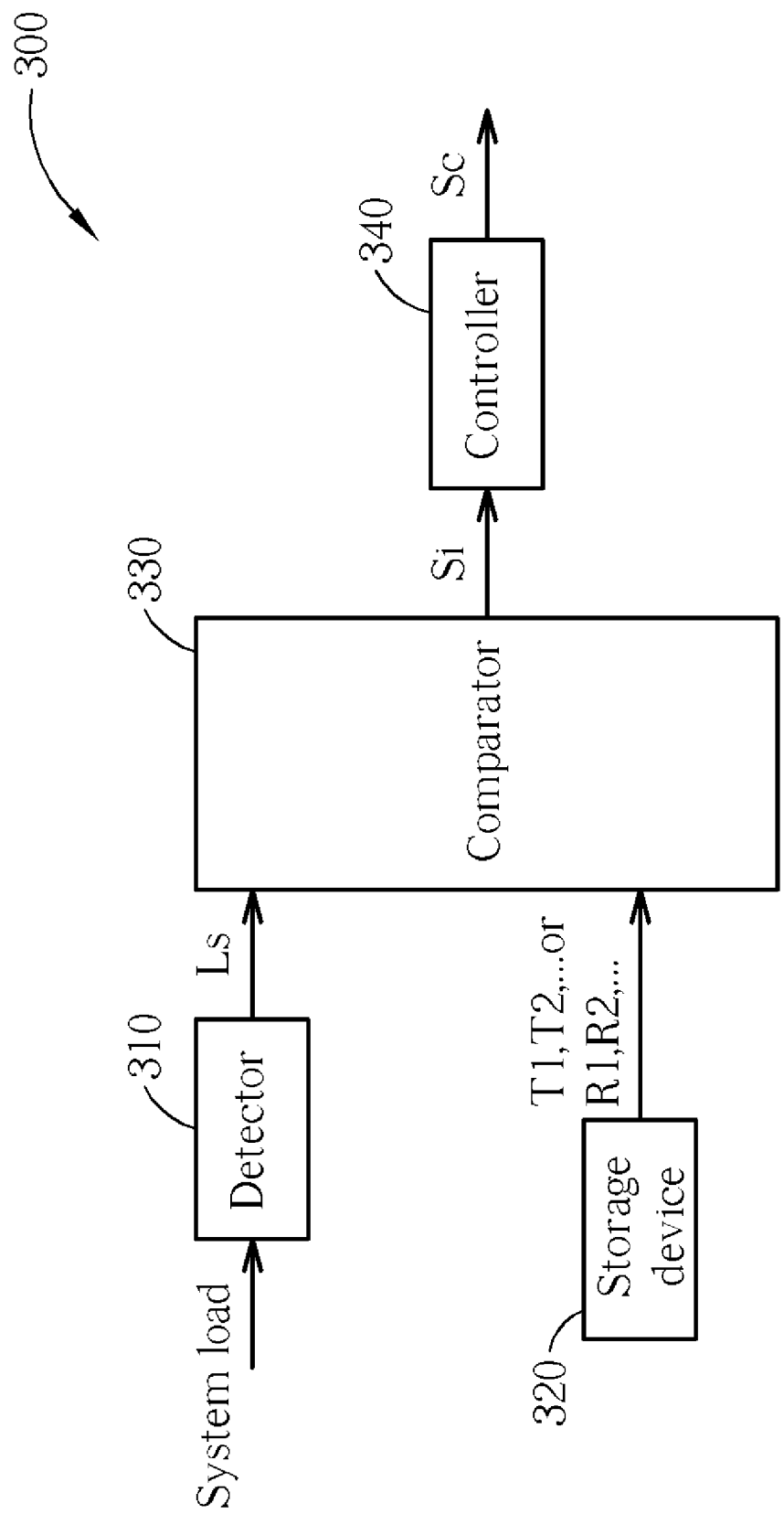
FIG. 3 shows a controlling circuit for controlling an operating clock of a logic circuit according to a first embodiment of the claimed invention.

For the sake of preventing an electronic system that has a logic circuit, such as a CPU, from being unable to return from an overclocking or an underclocking status to a normal status, at least one return value, which is utilized for determining the ending time point of the overclocking or underclocking status is introduced. Please refer to FIG. 3. FIG. 3 shows a controlling circuit 300 for controlling an operating clock of a logic circuit according to a first embodiment of the claimed invention. The apparatus is in an electronic device, such as a computer, and the electronic device has a logic circuit, such as a CPU. The controlling circuit 300 comprises a controlling module comprising a detector 310, a storage device 320, at least one comparator 330, and a controller 340.

The detector 310 detects the system load of the electronic device to generate a detection value Ls, which indicates the detected system load. According to different implementation choices of this embodiment, the system load can be determined by detecting the magnitude of the working current of the electronic device, deriving a specific parameter corresponding to the system load from an operation system (OS) being executed by the electronic device, or detecting a duty cycle of a PWM controller contained in the electronic device.

The storage device 320 stores a plurality of threshold values T1, T2, . . . and a plurality of return values R1, R2, . . . respectively corresponding to the threshold values, where the R1, R2, . . . return values are respectively different from the threshold values T1, T2, . . . . According to different implementation choices of this embodiment, the storage device can be a hard disk, a non-volatile memory, or a plurality of registers. By comparing the detection value Ls with one of the threshold values T1, T2, . . . or one of the return values R1, R2, . . . , the comparator 330 sends an indication signal Si to the controller 340, which in response generates a control signal Sc to control the overclocking or underclocking status of the logic circuit (not shown). That is, the control circuit 300 is capable of monitoring the system load through the comparison result(s) represented by the indication signal Si, where the controller 340 may determine whether to enable/disable overclocking or underclocking of the logic circuit (e.g., the CPU) when the detection value Ls reaches one of the threshold values or one of the return values mentioned above.

Figure 4:
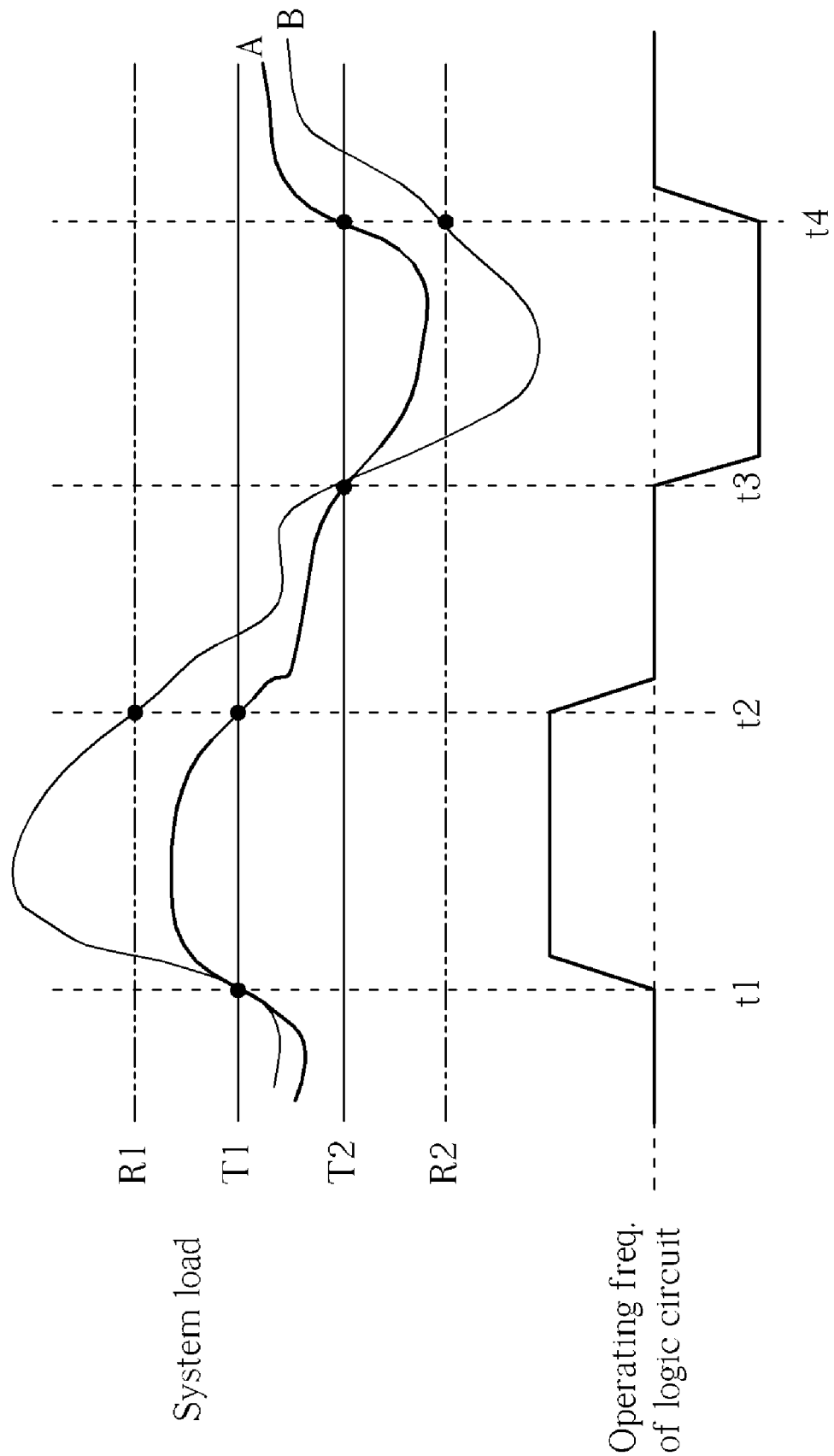
FIG. 4 shows curves of the system load and the corresponding operating frequency of the logic circuit in some situations.

Please refer to FIG. 4. FIG. 4 shows curves A and B of the system load and the corresponding operating frequency of the logic circuit, where two threshold values Ti and T2 and two corresponding return values R1 and R2 are involved, and the operating frequency is the frequency of the operating clock, which is typically generated by a clock generator. Here, curve A typically represents that the driving voltage inputted into the logic circuit is constant, while curve B typically represents that the driving voltage inputted into the logic circuit is varied. More specifically, according to the present invention, the controller 340 may increase the driving voltage inputted into the logic circuit before enabling overclocking of the logic circuit at the time point t1, and after disabling overclocking of the logic circuit at the time point t2, the controller may further decrease the driving voltage at a specific time point t2' (not shown), during the interval between the time points t2 and t3. There are various methods for determining the time point t2' according to different implementation choices of this embodiment. According to an implementation choice, the time point t2' can be determined by detecting the right time when the operating clock stops decreasing and becomes constant. According to another implementation choice, the time point t2' can be determined according to a predetermined delay value corresponding to the time interval between the time points t2 and t2'. According to another implementation choice, the time point t2' can be determined according to a predetermined frequency threshold between overclocked level and the initial level of the operating frequency. At least one of these implementation choices can be applied to this embodiment according to some trial experiments and typical/maximum/minimum values related to the specifications of the control circuit.

In addition, after enabling underclocking of the logic circuit at the time point t3, the controller 340 may decrease the driving voltage inputted into the logic circuit at a specific time point t3' (not shown), during the interval between the time points t3 and t4. Similarly, there are various methods for determining the time point t3' according to different implementation choices of this embodiment, where the methods for determining the time point t3' with respect to the time point t3 are similar to the methods for determining the time point t2' with respect to the time point t2, and therefore not repeated here. Additionally, the controller 340 may further increase the driving voltage before disabling underclocking of the logic circuit at the time point t4. According to the timing control of increasing/decreasing the driving voltage as mentioned, an objective of stable operation of the logic circuit can be achieved.

At time t1, when the system load increases to reach the threshold value T1, the comparator 330 generates a first indication signal $S_1$ to notify the controller 340, and the controller 340 enables overclocking of the logic circuit through the control signal Sc. As a result of increasing the driving voltage and/or enabling overclocking, the operating frequency of the logic circuit is increased. At time t2, when the system load decreases to reach the threshold value T1 (regarding curve A) or the return value R1 (regarding curve B), the comparator 330 generates a second indication signal $S_2$ to notify the controller 340, and the controller 340 disables overclocking of the logic circuit through the control signal Sc. As a result of utilizing the return value R1, the operating frequency of the logic circuit is capable of returning to its normal status, although the system load may idle above the threshold value T1. Thus, the related art problem of failing to trigger the decrease of the operating frequency of the CPU at the time point t2 is solved.

Furthermore, at time t3, when the system load decreases to reach the threshold value T2, the comparator 330 generates a third indication signal $S_3$ to notify the controller 340, and the controller 340 enables underclocking of the logic circuit through the control signal Sc. As a result of enabling underclocking and/or decreasing the driving voltage, the operating frequency of the logic circuit is decreased. At time t4, when the system load increases to reach the threshold value T2 (regarding curve A) or the return value R2 (regarding curve B), the comparator 330 generates a fourth indication signal $S_4$ to notify the controller 340, and the controller 340 disables underclocking of the logic circuit through the control signal Sc. As a result of utilizing the return value R2, the operating frequency of the logic circuit is capable of returning to its normal status, although the system load may idle below the threshold value T2. Thus, the corresponding problem of failing to trigger the increase of the operating frequency of the CPU at the time point t4 is solved.

It is noted that according to the embodiment mentioned above, objectives of high performance during overclocking and effective power-saving during underclocking can be achieved.

In addition, the threshold values (e.g., T1 and T2) and the return values (e.g., R1 and R2) can be determined according to trial experiments and/or according to typical/maximum/minimum values related to the specifications of the control circuit.

Figure 5:
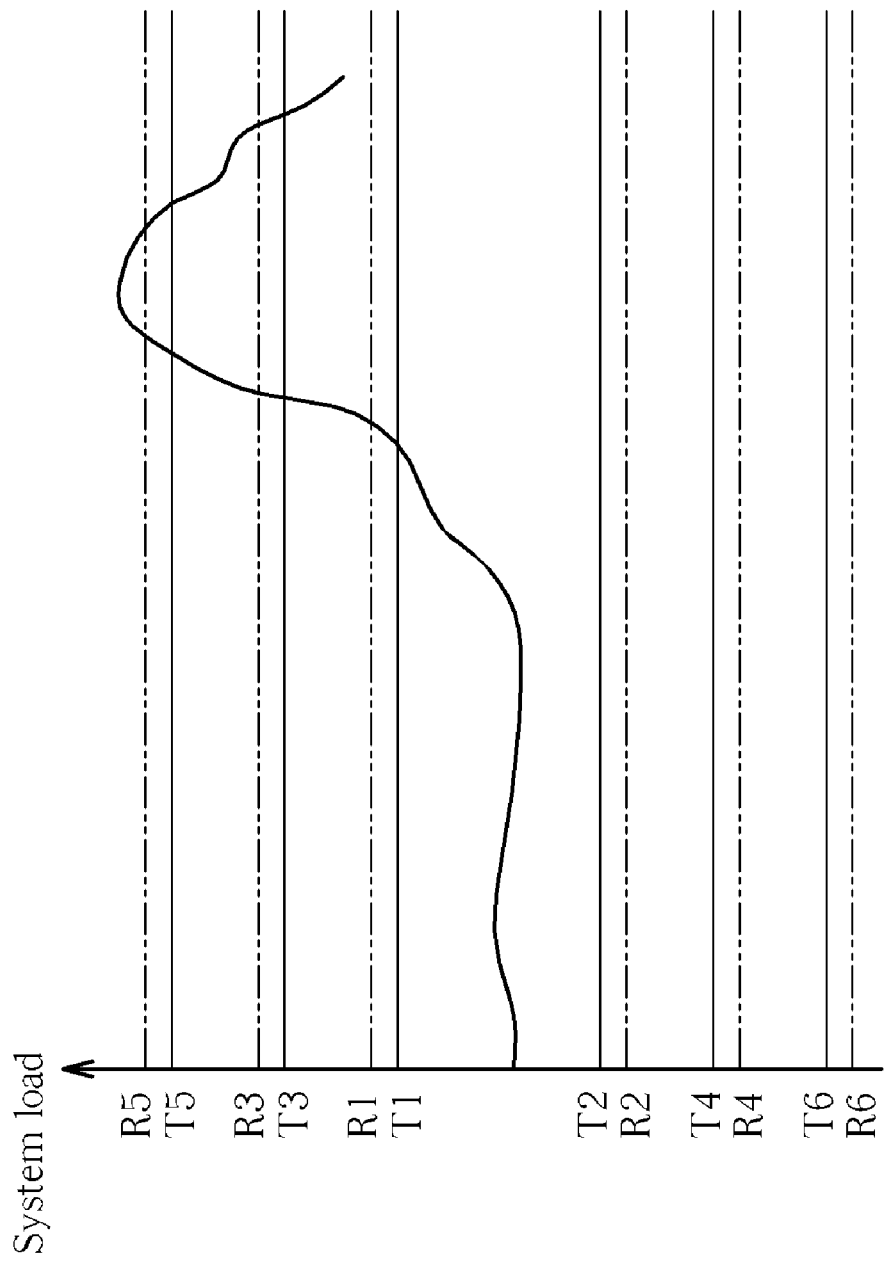
FIG. 5 illustrates a curve of the system load together with multiple threshold values and multiple return values according to a variation of the embodiment shown in FIG. 4.

Please refer to FIG. 5. FIG. 5 illustrates a curve of the system load together with multiple threshold values T1, T2, T3, T4, T5, and T6 and multiple return values R1, R2, R3, R4, R5, and R6 according to a variation of the embodiment shown in FIG. 4, where the variation is similar to the embodiment mentioned above. In this variation, the return values for disabling overclocking (e.g., R1, R3, and R5) are respectively higher than the corresponding threshold values (e.g., T1, T3, and T5), and the return values for disabling underclocking (e.g., R2, R4, and R6) are respectively lower than the corresponding threshold values (e.g., T2, T4, and T6). This variation illustrates that multiple return values corresponding to multiple threshold values can be implemented according to the present invention. It is noted that these return values and threshold values can be stored as a table in the storage device 320.

Figure 6:
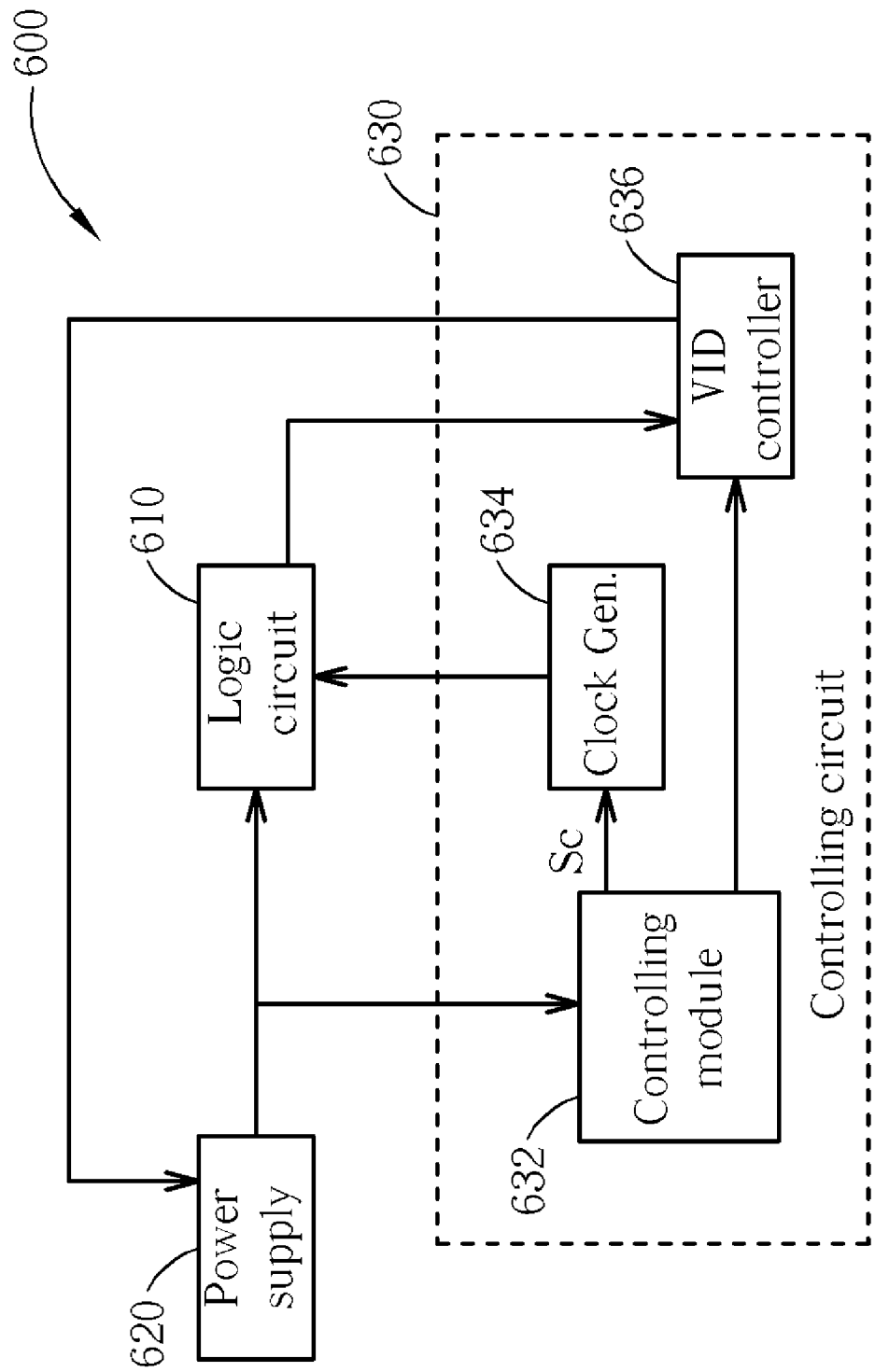
FIG. 6 shows a block diagram of an electronic device with a controlling circuit for controlling the operating clock and the driving voltage of a logic circuit of the electronic device according to another embodiment of the present invention.

Please refer to FIG. 6. FIG. 6 shows a block diagram of an electronic device 600 with a controlling circuit 630 for controlling the operating frequency and the driving voltage of a logic circuit 610 of the electronic device 600 (e.g., the CPU mentioned above) according to another embodiment of the present invention. In addition to the logic circuit 610 and the controlling circuit 630, the electronic device 600 further comprises a power supply 620. The power supply 620 provides the logic circuit 610 with a driving voltage. The controlling circuit 630 comprises a controlling module 632, a clock generator 634 such as the clock generator mentioned above, and a VID (Voltage Identification) controller 636. As the controlling circuit 630 of this embodiment can be implemented with the above-mentioned controlling circuit 300, and as the controlling module 632 of this embodiment can be implemented with the above-mentioned controlling module comprising the detector 310, the storage device 320, the at least one comparator 330, and the controller 340 shown in FIG. 3, some of the operations are not repeated in detail for simplicity. When the system of the electronic device 600 boots up, the logic circuit 610 initially sends a signal to inform the VID controller 636 of the required voltage level of the driving voltage, and then the VID controller 636 drives the power supply 620 to provide the driving voltage of the required voltage level to the logic circuit 610. The controlling module 632 detects the system load of the electronic device 600. The system load can be found in several ways. For example, the controlling module 632 can detect the system load by detecting the magnitude of the working current of the electronic device, or by deriving a specific parameter corresponding to the system load from an operation system (OS) executed by the electronic device, or by detecting a duty cycle of a PWM controller contained in the electronic device. Based on the detected system load of the electronic device 600, the controlling module 632 sends signals to control the clock generator 634 and the VID controller 636. The clock generator 634 provides the logic circuit 610 with an operating clock such as the operating clock mentioned above, and adjusts the frequency of the operating clock according to the signal from the controlling module 632. The VID controller 636 controls the power supply to adjust the voltage level of the driving voltage according to the signal from the controlling module 632.

Figure 7:
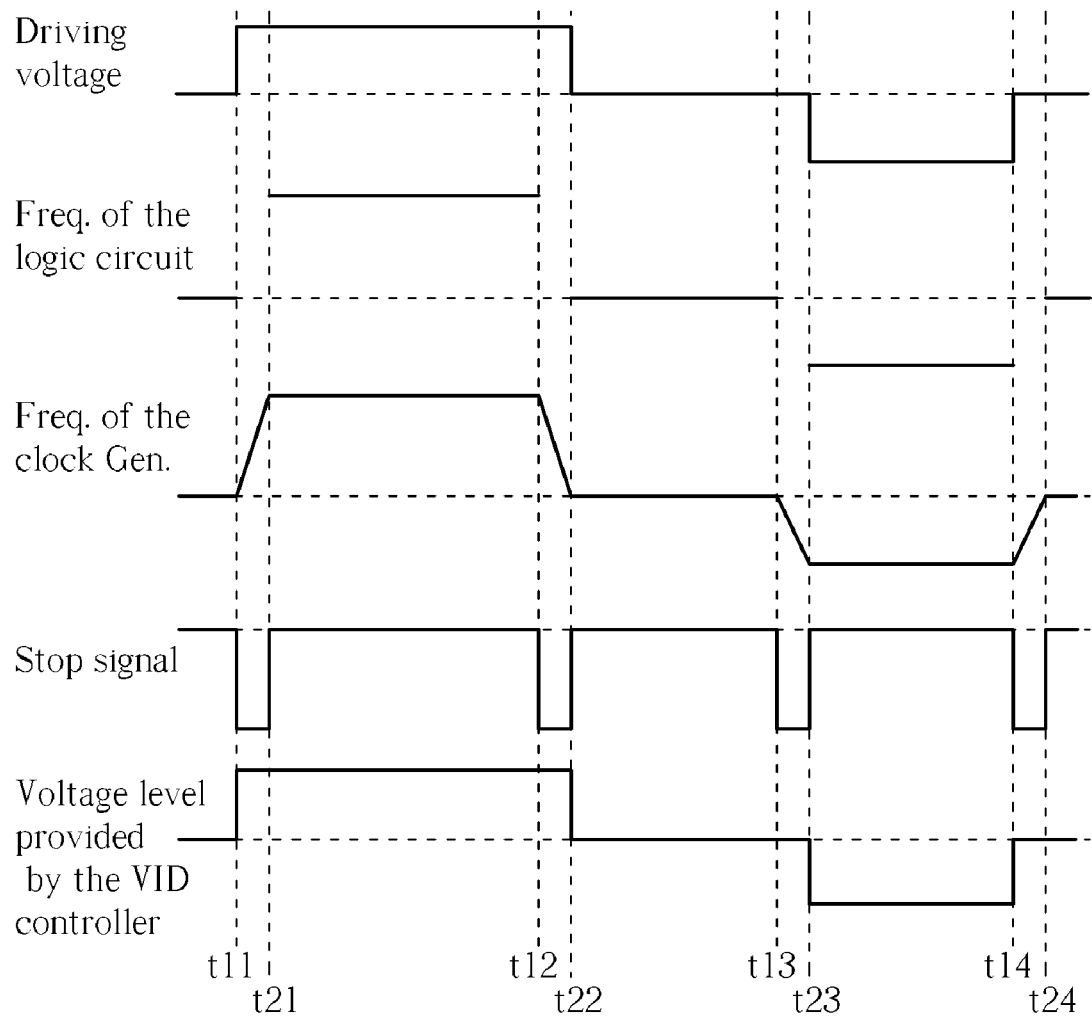
FIG. 7 shows a timing diagram of several signals of the electronic device shown in FIG. 6.

Please refer to FIG. 7. FIG. 7 shows a timing diagram of several signals of the electronic device 600. At the time point t11 when the controlling module 632 detects an increase of the system load, the controlling module 632 first sends a control signal to the VID controller 636. The voltage level provided by the VID controller 636 increases, and accordingly the power supply 620 provides the logic circuit 610 with a high-level driving voltage. Then, the controlling module 632 sends an indication signal to the clock generator 634, so the clock generator 634 begins to increase its frequency. Please note that during the interval from the time point t11 to time t21 when the clock generator 634 changes its frequency, the controlling module 632 optionally sends a stop signal to the clock generator 634. When receiving the stop signal, the clock generator 634 temporally stops outputting the operating clock. At the time point t21 when the frequency of the clock generator 634 reaches a target frequency of overclocking of the logic circuit 610, the stop signal is disabled, so the clock generator 634 again outputs the operating clock to the logic circuit 610. Afterwards, at the time point t12 when the controlling module 632 detects an decrease of the system load and determines to disable overclocking of the logic circuit 610, the controlling module 632 sends an indication signal to the clock generator 634, so the clock generator 634 changes its frequency until the frequency reaches the normal status. At the time point t22 when the frequency of the clock generator 634 reaches the normal frequency the controlling module 632 sends a control signal to the VID controller 636, so the voltage level provided by the VID controller 636 decreases, and accordingly the power supply 620 provides the logic circuit 610 with a normal driving voltage. Similarly, during the interval between the time point t12 and the time point t22, the controlling module 632 optionally sends the stop signal to prevent the clock generator 634 from outputting the operating clock until the frequency of the clock generator 634 reaches the normal frequency.

Additionally, at the time point t13 when detecting a decrease of the system load, the controlling module 632 controls the clock generator 634 to change its frequency. At the time point t23, the controlling module 632 controls the VID controller 636 to decrease the voltage level provided by the VID controller 636, so the power supply 620 provides the logic circuit 610 with a low-level driving voltage. Similarly, during the interval between the time point t13 and the time point t23, the controlling module 632 optionally sends the stop signal to prevent the clock generator 634 from outputting the operating clock until the frequency of the clock generator 634 reaches a target frequency of underclocking of the logic circuit 610. At the time point t14 when the controlling module 632 detects an increase of the system load and determines to disable underclocking, the controlling module 632 controls the VID controller 636 to increase the voltage level provided by the VID controller 636, so the power supply 620 provides the logic circuit 610 with the normal driving voltage. Then, the controlling module 632 controls the clock generator 634 to begin to increase its frequency. Similarly, during the interval between the time point t14 and the time point t24, the controlling module 632 optionally sends the stop signal to prevent the clock generator 634 from outputting the operating clock until the frequency of the clock generator 634 reaches the normal frequency.

Figure 8:
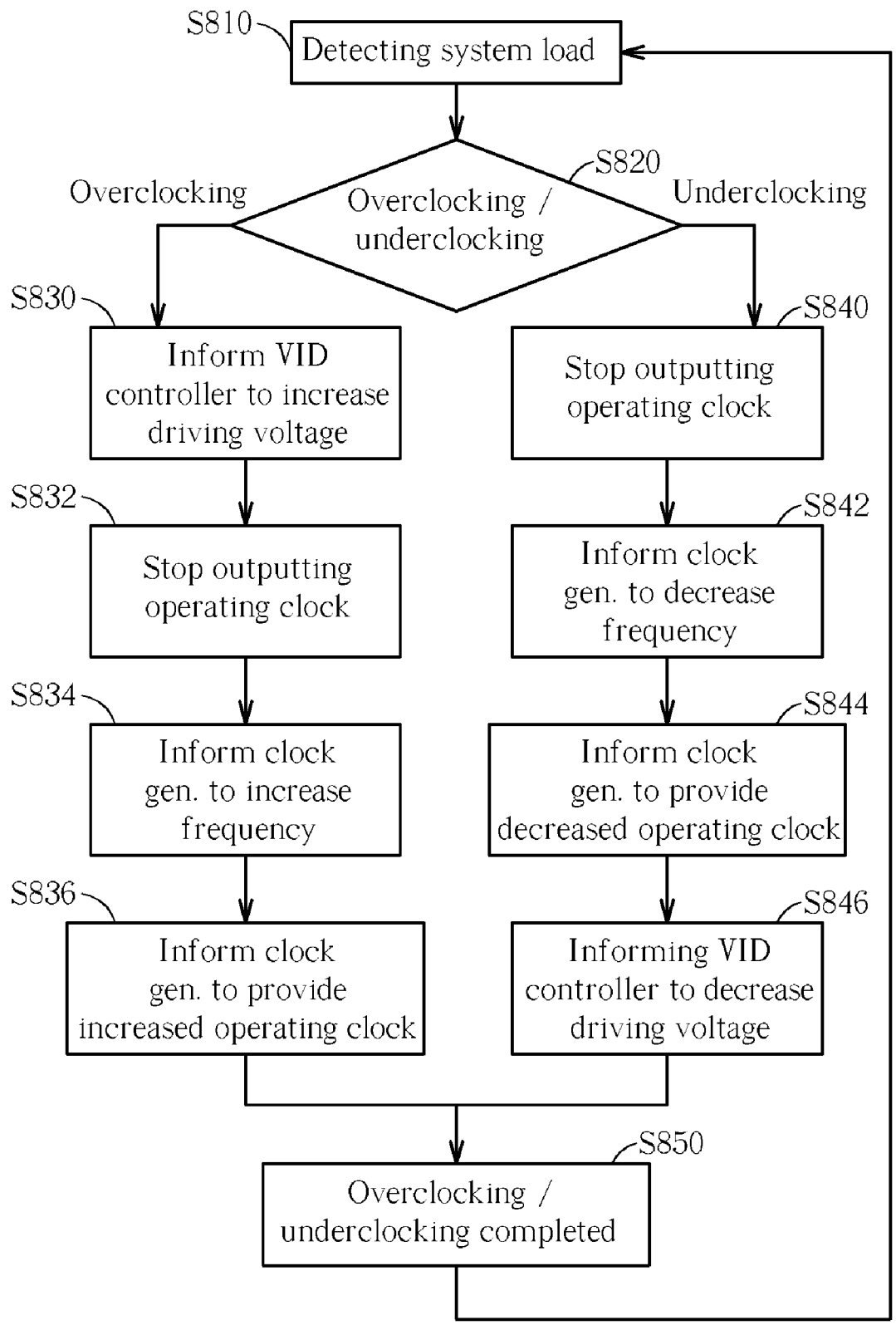
FIG. 8 is a flow chart of the overclocking and underclocking operations of the electronic device shown in FIG. 6.

Please refer to FIG. 8. FIG. 8 is a flow chart of the overclocking and underclocking operations of the electronic device 600. Initially the controlling module 632 detects the system load of the electronic device 600 (S810) and determines whether the overclocking operation or the underclocking operation should be performed (S820). If the overclocking operation is to be performed, the detector informs the VID controller 636 to increase the driving voltage (S830). The controlling module 632 then optionally sends the stop signal to stop the clock generator 634 to stop outputting the operating clock (S832) and informs the clock generator 634 to increase the frequency thereof (S834). If the controlling module 632 sends the stop signal to stop outputting the operating clock as mentioned, after the frequency of the operating clock reaches the target frequency of overclocking of the logic circuit 610, the controlling module 632 informs the clock generator 634 to provide the increased stable operating clock (S836). As a result, the overclocking operation is completed (S850). Alternately, if the underclocking operation is to be performed, the controlling module 632 optionally sends the stop signal to the clock generator 634 to stop outputting the operating clock (S840) and informs the clock generator 634 to decrease frequency (S842). If the controlling module 632 sends the stop signal to stop outputting the operating clock, after the frequency of the operating clock reaches the target frequency of underclocking of the logic circuit 610, the controlling module 632 informs the clock generator 634 to provide the decreased stable operating clock (S844). Additionally, the controlling module 632 informs the VID controller 636 to decrease the driving voltage (S846). As a result, the underclocking operation is finally completed (S850).

It is noted that as Steps S830-S836 correspond to increasing the operating frequency of the logic circuit, the working flow of Steps S830-S836 is applicable to either enabling overclocking or disabling underclocking mentioned above. Similarly, as Steps S840-S846 correspond to decreasing the operating frequency of the logic circuit, the working flow of Steps S840-S846 is applicable to either enabling underclocking or disabling overclocking mentioned above.

As a result of the present invention mechanism of well-designed timings to adjust the frequency of the operating clock and the driving voltage provides a more stable system during overclocking and underclocking operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is

1. A controlling circuit for controlling an operating clock of a logic circuit in an electronic device, comprising:
  a storage device, for storing a first threshold value and a first return value, the first threshold value being smaller than the first return value;
  a detector, for detecting a system load of the electronic device to generate a detection value;
  at least one comparator, coupled to the storage device and the detector, for comparing the detection value with the first threshold value or the first return value, wherein when the detection value increases to reach the first threshold value, the comparator generates a first indication signal, and then when the detection value decreases to reach the first return value, the comparator generates a second indication signal; and
  a controller, coupled to the comparator, for enabling overclocking of the logic circuit when receiving the first indication signal, and disabling overclocking of the logic circuit when receiving the second indication signal.

2. The controlling circuit of claim 1, wherein the storage device further stores a second threshold value and a second return value, and the second threshold is greater than the second return value; wherein the comparator generates a third indication signal when the detection value decreases to reach the second threshold value, and then the comparator generates a fourth indication signal when the detection value increases to reach the second return value;
  wherein the controller further enables underclocking of the logic circuit when receiving the third indication signal, and disables underclocking of the logic circuit when receiving the fourth indication signal.

3. The controlling circuit of claim 1, wherein the controller increases a driving voltage inputted into the logic circuit before enabling overclocking of the logic circuit, and the controller decreases the driving voltage at a specific time point after disabling overclocking of the logic circuit.

4. The controlling circuit of claim 1, wherein the electronic device is a computer, and the logic circuit is a central processing unit (CPU).

5. The controlling circuit of claim 1, wherein the storage device further stores a second threshold value and a second return value, and the second threshold is smaller than the second return value;
  wherein the comparator generates a third indication signal when the detection value increases to reach the second threshold value, and then the comparator generates a fourth indication signal when the detection value decreases to reach the second return value;

wherein the controller further enables overclocking of the logic circuit when receiving the third indication signal, and disables overclocking of the logic circuit when receiving the fourth indication signal.

6. A controlling circuit for controlling an operating clock of a logic circuit in an electronic device, comprising:
a storage device, for storing a first threshold value and a first return value, the first threshold value being greater than the first return value;
a detector, for detecting a system load of the electronic device to generate a detection value;
at least one comparator, coupled to the storage device and the detector, for comparing the detection value with the first threshold value or the first return value, wherein when the detection value decreases to reach the first threshold value, the comparator generates a first indication signal, and then when the detection value increases to reach the first return value, the comparator generates a second indication signal; and
a controller, coupled to the comparator, for enabling underclocking of the logic circuit when receiving the first indication signal, and disabling underclocking of the logic circuit when receiving the second indication signal.

7. The controlling circuit of claim 6, wherein the storage device further stores a second threshold value and a second return value, and the second threshold is smaller than the second return value; wherein the comparator generates a third indication signal when the detection value increases to reach the second threshold value, and then the comparator generates a fourth indication signal when the detection value decreases to reach the second return value;
wherein the controller further enables overclocking of the logic circuit when receiving the third indication signal, and disables overclocking of the logic circuit when receiving the fourth indication signal.

8. The controlling circuit of claim 6, wherein the controller decreases a driving voltage inputted into the logic circuit at a specific time point after enabling underclocking of the logic circuit, and the controller increases the driving voltage before disabling underclocking of the logic circuit.

9. The controlling circuit of claim 6, wherein the electronic device is a computer, and the logic circuit is a central processing unit (CPU).

10. The controlling circuit of claim 6, wherein the storage device further stores a second threshold value and a second return value, and the second threshold is greater than the second return value;
wherein the comparator generates a third indication signal when the detection value decreases to reach the second threshold value, and then the comparator generates a fourth indication signal when the detection value increases to reach the second return value;
wherein the controller further enables underclocking of the logic circuit when receiving the third indication signal, and disables underclocking of the logic circuit when receiving the fourth indication signal.

11. A method for controlling an operating clock of a logic circuit in an electronic device, comprising:
providing a storage device for storing a first threshold value and a first return value, the first threshold value being smaller than the first return value;
detecting a system load of the electronic device to generate a detection value;
comparing the detection value with the first threshold value or the first return value, wherein when the detection value increases to reach the first threshold value, generating a first indication signal, and then when the detection value decreases to reach the first return value, generating a second indication signal; and
enabling overclocking of the logic circuit in accordance with the first indication signal, and disabling overclocking of the logic circuit in accordance with the second indication signal.

12. The method of claim 11, wherein the storage device further stores a second threshold value and a second return value, the second threshold is greater than the second return value, and the method further comprises:
generating a third indication signal when the detection value decreases to reach the second threshold value, and then generating a fourth indication signal when the detection value increases to reach the second return value; and
enabling underclocking of the logic circuit in accordance with the third indication signal, and disabling underclocking of the logic circuit in accordance with the fourth indication signal.

13. The method of claim 11, further comprising:
increasing a driving voltage inputted into the logic circuit before enabling overclocking of the logic circuit; and
decreasing the driving voltage at a specific time point after disabling overclocking of the logic circuit.

14. The method of claim 11, wherein the electronic device is a computer, and the logic circuit is a central processing unit (CPU).

15. The method of claim 11, wherein the storage device further stores a second threshold value and a second return value, the second threshold is smaller than the second return value, and the method further comprises:
generating a third indication signal when the detection value increases to reach the second threshold value, and then generating a fourth indication signal when the detection value decreases to reach the second return value; and
enabling overclocking of the logic circuit in accordance with the third indication signal, and disabling overclocking of the logic circuit in accordance with the fourth indication signal.

16. A method for controlling an operating clock of a logic circuit in an electronic device, comprising:
providing a storage device for storing a first threshold value and a first return value, the first threshold value being greater than the first return value;
detecting a system load of the electronic device to generate a detection value;
comparing the detection value with the first threshold value or the first return value, wherein when the detection value decreases to reach the first threshold value, generating a first indication signal, and then when the detection value increases to reach the first return value, generating a second indication signal; and
enabling underclocking of the logic circuit in accordance with the first indication signal, and disabling underclocking of the logic circuit in accordance with the second indication signal.

17. The method of claim 16, wherein the storage device further stores a second threshold value and a second return value, the second threshold is smaller than the second return value, and the method further comprises:
generating a third indication signal when the detection value increases to reach the second threshold value, and then generating a fourth indication signal when the detection value decreases to reach the second return value; and enabling overclocking of the logic circuit in accordance with the third indication signal, and disabling overclocking of the logic circuit in accordance with the fourth indication signal.

18. The method of claim 16, further comprising:

decreasing a driving voltage inputted into the logic circuit at a specific time point after enabling underclocking of the logic circuit; and increasing the driving voltage before disabling underclocking of the logic circuit.

19. The method of claim 16, wherein the electronic device is a computer, and the logic circuit is a central processing unit (CPU).

20. The method of claim 16, wherein the storage device further stores a second threshold value and a second return value, the second threshold is greater than the second return value, and the method further comprises:

generating a third indication signal when the detection value decreases to reach the second threshold value, and then generating a fourth indication signal when the detection value increases to reach the second return value; and enabling underclocking of the logic circuit in accordance with the third indication signal, and disabling underclocking of the logic circuit in accordance with the fourth indication signal.

* * * * *